April 30, 1963 G. HIRS 3,087,620
FILTER APPARATUS
Original Filed Jan. 15, 1959 4 Sheets-Sheet 3
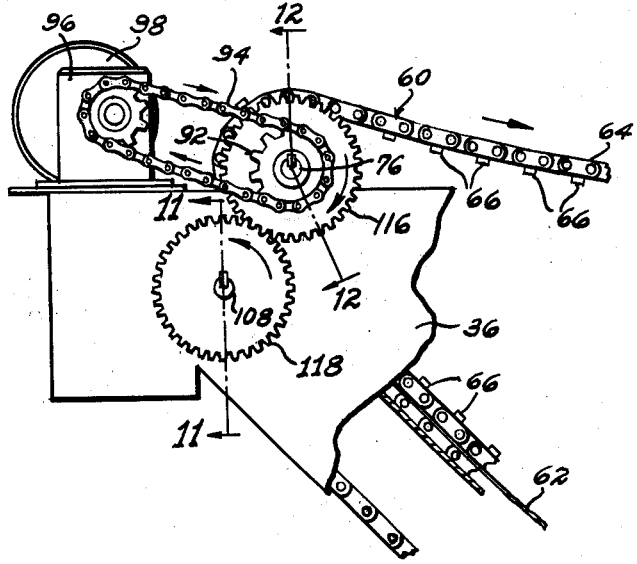
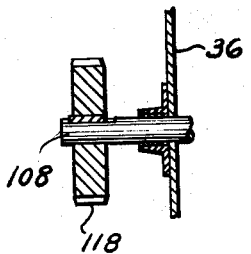
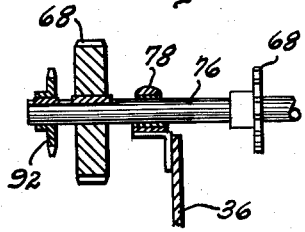
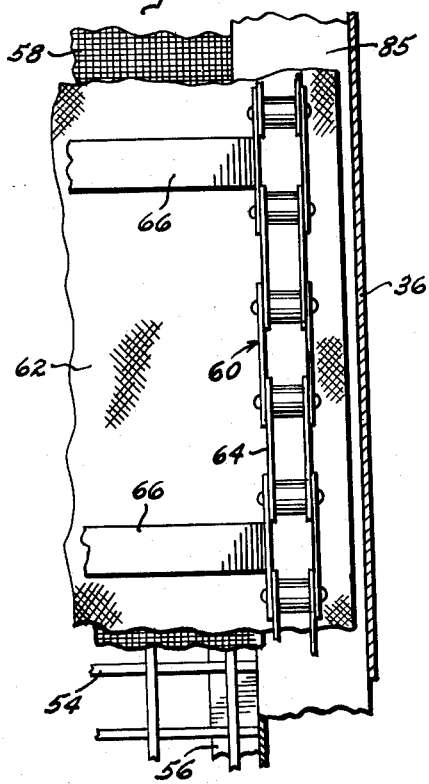
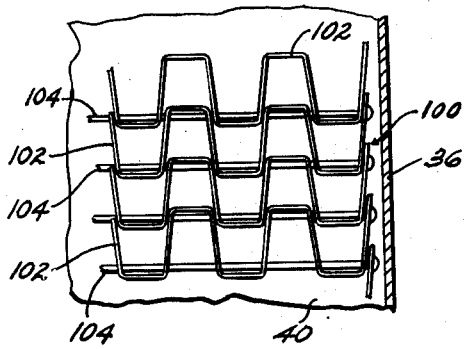
INVENTOR.
GENE HIRS.
BY
Wallace P. Lamb
ATTORNEY.

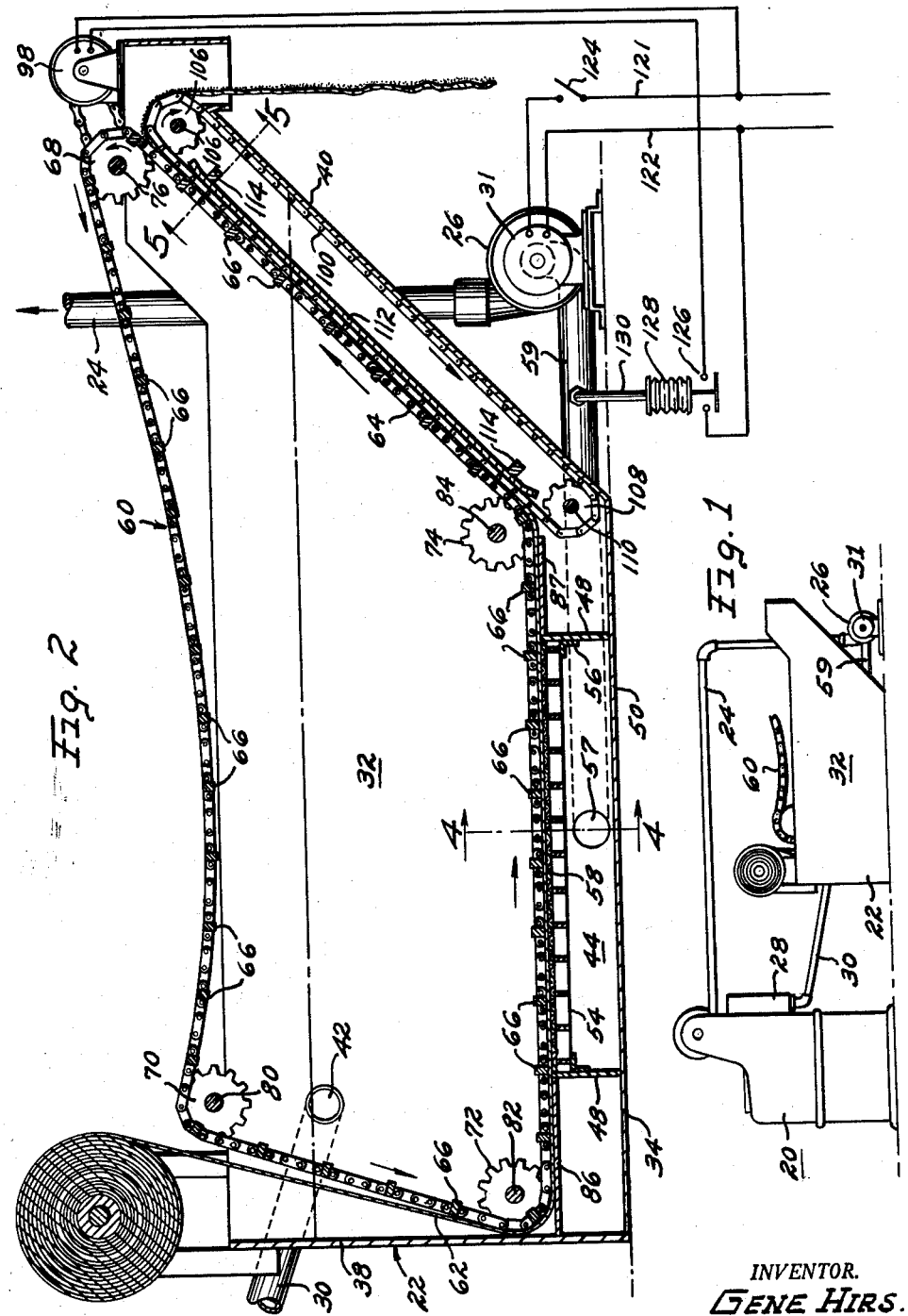

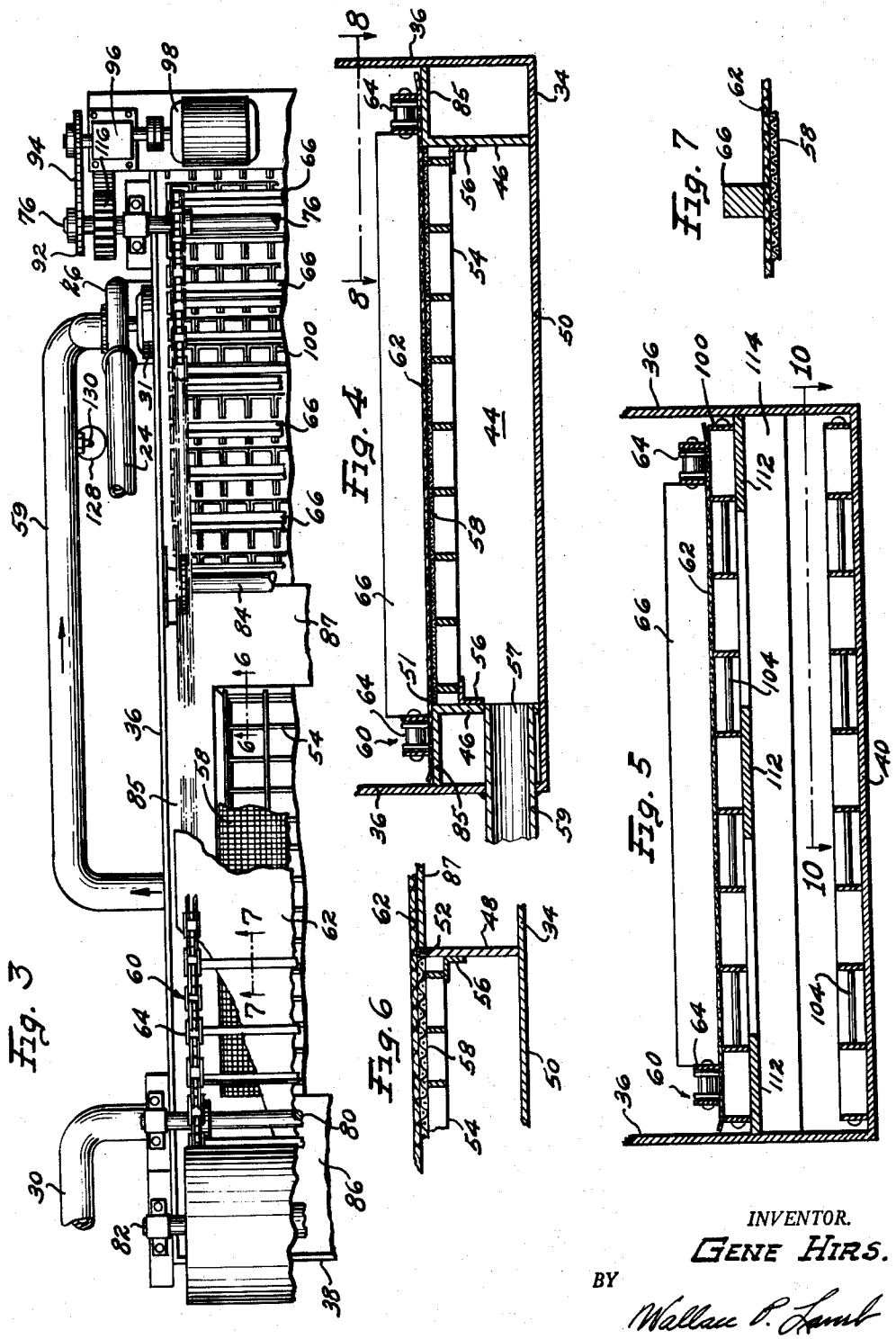

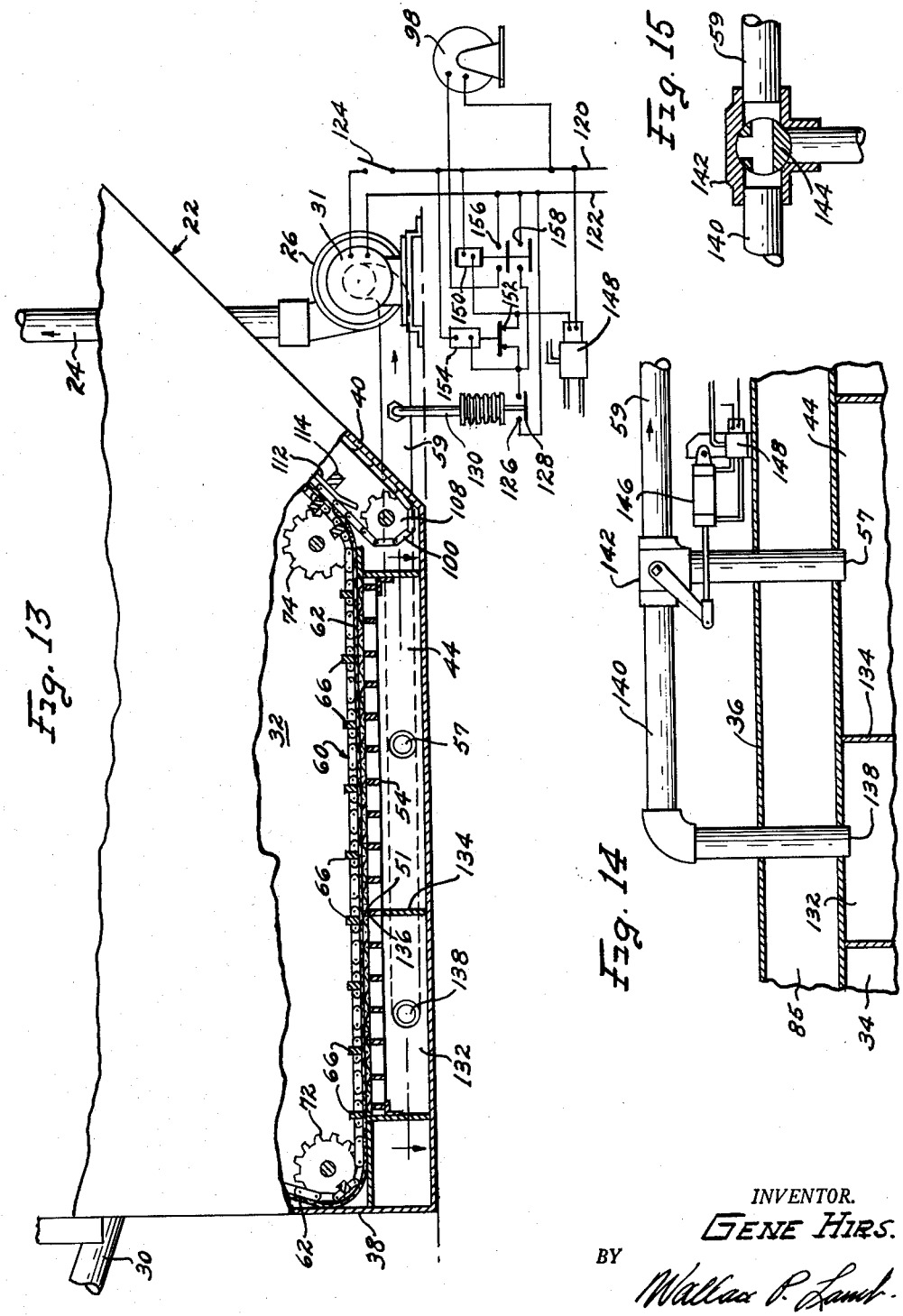

3,087,620
FILTER APPARATUS
Gene Hirs, 17208 Greenview Road, Detroit, Mich.
Continuation of application Ser. No. 786,994, Jan. 15, 1959. This application Mar. 27, 1961, Ser. No. 99,012
3 Claims. (Cl. 210—111)

This invention relates generally to filter apparatus and particularly to liquid filter apparatus.

This invention is a continuation of my copending application filed January 15, 1959, Serial No. 786,994 for Filter Apparatus, now abandoned.

It is an object of my invention to provide an improved liquid filter apparatus that makes it possible to achieve the benefits that result from the filtering of liquid by means of a filter media submerged in the liquid.

Another object of the invention is to provide an improved liquid filter apparatus of a structural character such that it is possible to have a submerged filter media that can be replaced without interruption of the filtering operation.

Another object is to provide an improved submerged filter media type of filter apparatus constructed to provide for replacement of the filter media during filtering operation without the liquid by-passing the media.

Another object of the invention is to provide an improved liquid filter apparatus capable of achieving the benefits of suction induced flow of liquid through the filter media without the suction induced differential pressure on opposite sides of the filter media preventing replacement of the media.

Another object of the invention is to provide an improved filter apparatus of such construction and cooperation of its elements as to effect efficient filtering of liquid without the usual rapid clogging of the filter media.

Another object of the invention is to provide a filter apparatus of the above mentioned character in which the filter media is automatically replaced in response to a predetermined decrease in pressure on the outlet side of the media caused by accumulation of foreign matter over the inlet side.

A further object of the invention is to provide an efficient yet inexpensive liquid filter apparatus.

Other objects of the invention will become apparent from the following detailed description, taken in connection with the accompanying drawings in which:

FIG. 1 is a side view of my improved filter apparatus and a cutting tool machine receiving a cutting oil and coolant from the filter;

FIG. 2 is a vertical sectional view of the filter apparatus shown partly in elevation;

FIG. 3 is a fragmentary plan view of the filter apparatus;

FIG. 4 is an enlarged cross sectional view, taken along line 4—4 of FIG. 2;

FIG. 5 is another enlarged cross sectional view, taken along line 5—5 of FIG. 2;

FIG. 6 is a fragmentary vertical sectional view, taken along line 6—6 of FIG. 3;

FIG. 7 is another fragmentary vertical sectional view, taken along line 7—7 of FIG. 3;

FIG. 8 is a fragmentary plan view, partly in section and taken in the direction of the arrows 8—8 of FIG. 4;

FIG. 9 is a fragmentary side view of drive mechanism of the filter apparatus;

FIG. 10 is a fragmentary plan view, partly in section and taken along line 10—10 of FIG. 5;

FIG. 11 is a detail sectional view, taken along line 11—11 of FIG. 9, and

FIG. 12 is another detail sectional view, taken along line 12—12 of FIG. 9.

Referring to the drawings by characters of reference, there is shown by way of illustrating the invention, a cutting tool machine 20 to which my filter 22 is communicatively connected to supply a coolant or cutting oil to the tool. The coolant is delivered from the filter 22 to the machine tool through a supply pipe 24 by a pump 26 and the coolant, containing dirt, chips and other foreign matter, drains to a pan 28 whence the coolant drains back, by way of a return pipe 30, to the filter 22. A suitable electric motor 31 may be used to drive the pump 26.

The filter 22 includes a tank 32 having a bottom wall 34, upright side walls 36, and opposite end walls 38 and 40. An inlet 42 is provided in one of the tank side walls 36 to which the return pipe 30 is connected, such as, by suitable pipe fittings. At the bottom of the tank 32, I provide an outlet chamber 44 formed by upright side walls 46, end walls 48 and a portion 50 of the tank bottom wall 34. These walls form a box-like structure that extends partly upwardly into the coolant, the upper edges of the walls defining an upwardly facing outlet 51 for the tank 32 for flow of the liquid coolant from the tank downwardly into the outlet chamber 44. The upper edges of the outlet chamber walls 46 and 48 also provides an upwardly facing seat 52.

In the outlet chamber 44 at the tank outlet 51 is a grate 54 that spans the outlet and may be supported by angle members 56 on the walls 46 and 48, and overlying and supported by the grate 54 is a liquid pervious backing member or metal screen 58. Preferably the upper surface of the screen 58 is in the same plane as the seat 52. The screen 58, grate 54 and angle supports 56 may be welded together and the supports may be welded to the walls 46 and 48 of the outlet chamber 44. An outlet 57 for chamber 44 is provided and is connected by a pipe 59 to the intake of pump 26.

A conveyor 60 is provided to hold a strip of filter media 62 down in overlying relation to outlet 51 and against seat 52 to overcome the tendency of the media to float upwardly in the liquid and also to move the media along a path of travel whereby to remove the foreign matter and replace the media over the outlet 51. To accomplish this, the conveyor 60 comprises two laterally spaced apart chains 64 and longitudinally spaced hold down members or flight bars 66 that extend transversely of and are carried by the chains. The flights 66 may be welded or otherwise secured at their opposite ends to corresponding links respectively of the chains 64. As will be more fully understood as the description proceeds, the flights 66 function to hold the filter media 62 down against the seat 52 and also function to grip and carry the media along the path of travel when the media is moved to replace the soiled portion and discharge the foreign matter from the tank.

A pair of drive sprockets 68, and three pair of guide sprockets 70, 72 and 74 are arranged such that the conveyor 60 is guided thereby down into the liquid adjacent tank end wall 38 and then horizontally across the seat 52 in close proximity thereto and then upwardly out of the liquid near the tank end wall 40. The pair of drive sprockets 68 are fixed onto a drive shaft 76 which may be rotatably supported in bushings 78 which may be suitably supported and secured to the tank side walls 36 above the tank end wall 40. The pairs of guide sprockets 70, 72, and 74 are rotatably mounted respectively on shafts 80, 82 and 84 which may be mounted on and suitably fixed to the tank side walls 36.

The chains 64 are of the endless type, and as seen from the side view of FIG. 2, the centers of the sprockets define the apices of a quadrilateral. The arrangement of the sprockets is such that the conveyor 60 travels from guide sprocket 70 downwardly at an angle toward tank end wall 38 and the conveyor traveling from guide sprockets 74 to drive sprockets 68 travels upwardly and outwardly providing a ramp up which the foreign matter is carried and discharged over the upper edge of tank end wall 40. The upper sprockets 68 and 70 are above the level of the liquid in tank 32, the drive sprockets 68 preferably being slightly above the guide sprocket 70. From the above description it will be appreciated that I have provided an inverted conveyor having its lead side largely submerged in the liquid to guide the floatable filter media 62 downwardly into the liquid over the liquid outlet 51 and then out of the tank.

To support the horizontal portion of the conveyor 60 in proper relationship to the outlet 51, the side walls 46 of the outlet chamber 44 are provided with a closure and slideways including horizontal wall portions 85 that extend between walls 46 and tank side walls 36. Also, the closure and slideways include a horizontal portion 86 that extends from end chamber wall 48 to end tank wall 38, and a horizontal portion 87 that extends from the other chamber end wall 48 toward tank end wall 40. These horizontal wall portions 85, 86 and 87 provide an upper surface in the plane of and surrounding seat 52 for slidably supporting the conveyor 60 over outlet 51.

One end of the drive shaft 76 projects beyond its adjacent bushing 78 sufficiently to receive a driven sprocket 92 that is driven by a chain drive 94 from the shaft of a speed reduction mechanism 96 which is in turn driven by a suitable electric motor 98.

A second endless conveyor 100 is provided to cooperate with and aid conveyor 60 in moving the filter media 62 along its path of travel to replace the soiled media over outlet 51. The conveyor 100 is arranged at the same angle as the ramp portion of conveyor 62, the conveyor having their lead sides in back-to-back relationship so as to grip the filter media therebetween, as illustrated in FIG. 2. The conveyor 100 may be of any suitable type, such as the metallic belt, the construction of which is best shown in FIG. 10. This is a well known link type construction comprising a plurality of sinuously formed sheet metal cross members or flights 102 that are pivotally inter-connected by parallel cross rods 104. In addition to the strength and flexibility of the conveyor 100, the upper edges of the sinuous flights 102 collectively present a large gripping surface to urge the filter media along its path of travel on shifting of the filter media in the replacement operation.

The conveyor 100 travels about an upper pair of driven sprockets 106 and a lower pair of guide sprockets 108 arranged such that the upper or lead side of conveyor 100 is parallel to the lower lead side of conveyor 60. The upper sprockets 106 of conveyor 100 are fixed on a driven shaft 108 that may be suitably journaled on mountings on the tank sisde walls 36, and the guide sprockets 108 are mounted for rotation on a shaft 110 which may be suitably fixed in and to side walls 36. Spaced supports 112 provide a ramp and slideway under the lead side of conveyor 100, the ramp being supported by cross members 114 which may be welded or otherwise secured to the tank side walls 36. The trailing side of conveyor 100 is preferably supported and slidably guided on tank end wall 40 which, as shown in FIG. 2, is inclined parallel to the ramp 112. The conveyors 60 and 100 are driven at the same rate of speed by motor 98 which drives conveyor 100 through gears 116 and 118 which are respectively keyed to shafts 76 and 108.

The electric motor 31 that drives the pump 26 may be connected by leads 121 and 122 to a suitable source of electric power, and in lead 121 there may be provided the usual line switch 124. Controlling the conveyor drive motor 98 is a pressure responsive switch 126 which is represented as being operable by a closed bellows 128 that is connected by a pipe 130 to the intake pipe 59 of pump 26. Thus, the switch 126 is responsive to a predetermined decrease in pressure in outlet chamber 44, indicative of a need for replacement of the filter media portion over outlet 52.

Operation

In operation of my filter apparatus the pump 26 is started when line switch 124 is closed, and the pump operates continuously, or so long as it is desired to supply coolant to the cutting tool of machine 20. As previously mentioned, the coolant is circulated between the machine drain pan 28 and the filter apparatus tank 32 and the quantity of coolant employed in the circulatory system determines the liquid level in the tank. As the pump 26 operates, it draws the liquid in tank 32 through the filter media overlying outlet 51 into the outlet chamber 44 whence the clean liquid flows to the intake of pump 26 through pipe 59 and is delivered through pipe 24 to the cutting tool of machine 20. Some of the larger particles of dirt and other foreign matter in the contaminated coolant are suspended in the liquid in tank 32 and under the current inducing influence of the liquid entering the tank at inlet 42 move toward and settle on that portion of the filter media extending up the ramp 112 of the conveyor 60. In this manner some of the foreign matter can be removed from the liquid without the need of filtering out the matter at the outlet 51 with the advantage that such matter does not contribute to decrease in flow rate through the media at outlet 51. Other foreign matter will settle on the filter media at the outlet 51 under the influence of pump 26, but in contrast to the situation prevailing in high pressure systems, the foreign matter is not packed into the interstices of the media and thus does not rapidly clog the media. Instead the foreign matter piles up on the media forming a good filter aid therefore, the rate of flow being substantially inversely proportional to the increase in the depth of the foreign matter on the media. This means that a less frequent replacement of the media over the outlet is required whereby optimum liquid filtering efficiency is attained. However, eventually the liquid flow rate will decrease to an inefficient rate as will be indicated by a predetermined decrease in pressure in outlet chamber 44 for which predetermined pressure switch 126 is set. When this predetermined pressure is reached, switch 126 closes and starts motor 98 which simultaneously drives both conveyors 60 and 100 to move the filter media 62 along its path of travel, indicated by the arrows so as to replace at least part of the media over outlet 51 and at the same time feed the soiled media and foreign matter thereon out of the liquid at the top of the ramp and discharge the media and foreign matter over the end wall 40 where a disposal container (not shown) may be provided. When the conveyors 60 and 100 are first started to move, the pressure differential of the liquid in tank 32 and outlet chamber 40 holding the media 62 against screen 58 is sufficient to prevent movement of the media with the conveyors. As a result, the conveyors move relative to the media for a short distance during which my hold-down flights 66 function to scrape away some of the foreign matter from the media which increases flow from tank 32 to outlet chamber 44 with accompanying decrease in the pressure differential to a point where the full force of the conveyors prevail in moving the media. When the conveyor flights scrape away some of the foreign matter from the filter media, the liquid rate of flow increases through the scraped away areas, but this will not appreciably increase the pressure in chamber 44 to the point where switch 126 would open, provided that the capacity of the pump 26 is made such that it exceeds the increased liquid flow into the chamber. As an alternative way of maintaining the motor 98 operating for a desired interval, the pressure switch 126 may be of the slow closing type, or a timer, such as the timer 154 of FIG. 13 may be employed to control the motor 98. When the pressure differential between tank 32 and outlet chamber 44 decreases to a predetermined pressure, switch 126 opens and stops motor 98.

Referring now to FIGS. 13 to 15 inclusive, these views show a modification of my filter apparatus involving another way in which to decrease the pressure differential on the soiled filter media 62 so that the media may be moved along its path of travel by the conveyors without stopping the suction pump 26. As the apparatus of FIGS. 13, 14 and 15 is similar in many respects to the apparatus of FIGS. 1 to 12, like parts are designated by like characters of reference to avoid unnecessary repetitious description. In the modification, an auxiliary or by-pass chamber 132 is separated from main chamber 44 by a partition 134 and has an upwardly facing outlet and seat 136 for the filter media 62. The by-pass chamber 132 has an outlet 138 connected by a pipe 140 to the pipe 59 by means of a three-way valve 142 which includes a rotatable valve member 144. Normally, the valve member 144 is positioned to establish communication between main chamber 44 and pipe 59 and block communication between pipes 140 and 59, the valve member being rotatable ninety degrees to the position shown in FIG. 15 to establish open communication between pipes 140 and 59 and block communication between main chamber 44 and pipe 59. An air cylinder 146 may be employed to actuate valve member 144 and may be controlled by a solenoid 148. Solenoid 148 is in series circuit with the normally closed contacts 152 of an electrical timer 154 and the normally open contacts 126 of the pressure responsive switch 128. Relay 150 has a pair of contacts 156 in series circuit with the motor 98, and another pair of contacts 158 in series circuit with the timer 154. Also the relay contacts 158 are in series with the normally closed timer contacts 152 and the relay 150 which provides a holding circuit holding relay 150 energized after the pressure switch 128 initiates energization of relay 150 and soon thereafter opens its contacts 126 in response to the higher pressure in chamber 132.

When line switch 124 is closed, the motor 31 drives pump 26 which then functions to reduce the pressure in chamber 44 causing flow of liquid down through that portion of the filter media 62 overlying the outlet 51. The filtered liquid flows from chamber 44 through pipe 59 to the pump 26 which delivers the clean liquid to the tool of machine 20 from the pan 28 of which contaminated liquid drains back to tank 32 through return pipe 30. In time, the accumulation of foreign matter collected on the filter media 62 over outlet 51 reduces filtering efficiency to the point where replacement of the media is desirable and pressure switch 128 is set to close in response to a predetermined decrease in pressure in chamber 44 to effect the automatic replacement of the media. When the switch 150 closes, the solenoid 148 is energized through the circuit including the normally closed contacts 152 of the timer 154, and air cylinder 146 then actuates valve member 144 to connect the continuously operating pump 26 to the auxiliary chamber 132. This permits continued flow of liquid to pump 26, but from auxiliary outlet chamber 132 where the filter media is relatively clean or has little foreign matter collected thereon compared to the media over chamber 44. Thus, the pressure differential on opposite sides of the media overlying chamber 44 is decreased to allow movement of the filter media with the conveyors when the motor 120 is started. Simultaneously with energization of the valve controlling solenoid 148 through the series circuit including the normally closed contacts 152 and the now closed contacts 126, the relay 150 is energized, closing both sets of switches 156 and 158. The closing of switch contacts 156 starts motor 98 which then moves the conveyors 60 and 100 to move the filter media 62 along its path of travel out of the tank 32. Closing of the other contacts 158 establishes a holding circuit for the relay 150 through the normally closed timer contacts 152, and also through the timer 154. The timer 154 is set to open its contacts 152 at an interval corresponding to the time required for the replacement of a desired length of the filter media at the outlet chamber 44. The timer 154 is provided so that the motor 98 will not be stopped as soon as the valve 144 operates to establish communication of the pump 26 and auxiliary chamber 132 as otherwise would occur since the pressure in the auxiliary chamber 132 would be higher than the pressure setting of switch 128.

From the foregoing description, it will now be appreciated that I have provided an improved filter apparatus, the components of which cooperate to make it possible to replace a used filter media without need of interrupting the filtering operation. Also, it will be appreciated that in my filter apparatus, the filter media is submerged in the liquid to be filtered and is guided over an outlet on which a reduced pressure is applied to draw the liquid through the media so as to decrease the tendency to clog the filter media. Furthermore, I have provided a filter apparatus having an inverted conveyor which functions to hold the filter media down over the outlet and move the media during filtering operation to replace the soiled portion or part thereof and also carry the soiled media and dirt out of the apparatus. In addition, I have arranged for a submerged ramp portion of the conveyor to pick up suspended foreign particles whereby to reduce the amount of foreign matter that will settle on the media at the outlet with a corresponding increase in the intervals of replacing of the media.

While I have shown and described the invention in considerable detail, it will be understood that various changes may be made without departing from the spirit and scope of the invention.

What I claim is:

1. In a filter apparatus for removing contaminant particles from a contaminated liquid, a tank structure subdivided by common stationary wall means into an upper compartment adapted to maintain a substantially constant body of contaminated liquid and a lower compartment adapted to be filled with filtrate, said wall having openings therein interconnecting said compartments, a perforate filter medium in the form of a fibrous web, means for supplying said web from a roll, the web being supported by said wall means and having a portion interposed between said compartments to remove said particles from liquid flowing through said openings therebetween, such particles accreting on the upper surface of said web, an endless conveyor in the form of a closed loop having a lower reach depending into said upper compartment to confine the web against said wall means for support thereby and said conveyor having transverse flights contacting the upper surface of said interposed portion of said web and any contaminant accreted thereon, actuatable power means for advancing said conveyor in said loop with said flights advancing the interposed portion of said web and dragging out said accreted contaminant, a filtrate pump having its intake connected to said lower compartment to create a vacuum therein supplementing the static head of said contaminated liquid in said upper compartment, and means for reducing said vacuum prior to actuation of said power means.

2. In a filter, an open-topped tank adapted to maintain a body of contaminated liquid at atmospheric pressures and having wall means beneath the level of said body of liquid provided with an outlet opening, means defining a vacuum chamber underlying said wall means and having an upper opening registering with said outlet opening, said vacuum chamber being sealed continuously from the atmosphere by liquid in the tank, a perforate filter medium of a size and extent to at least cover said openings and effective to remove contaminant from liquid flowing from said tank into said chamber, means for withdrawing filtrate liquid from said chamber to create a sub-atmospheric pressure in said chamber, thereby inducing liquid flow through the medium at an effective pressure differential greater than that resulting from the depth of liquid overlying the medium, an endless conveyor in the form of a loop having a lower reach depending into said tank and having transverse flights overlying said medium in contact with any contaminant thereon, power means actuatable for advancing said conveyor in its loop to remove contaminant from the tank, means responsive to a decrease in the pressure in said vacuum chamber for actuating said power means.

3. In a filter apparatus for removing contaminant particles from a contaminated liquid, a tank structure subdivided by stationary wall means into an upper compartment for maintaining a substantially constant body of contaminated liquid and a lower compartment for receiving filtrate, said lower compartment being sealed from the atmosphere, said wall having openings therein interconnecting said compartments, a perforate filter medium supported by said wall means and interposed between said compartments to remove said particles from liquid flowing thru said openings therebetween, such particles accreting on the upper surface of said medium, an endless conveyor in the form of a closed loop having a lower reach depending into said upper compartment to be supported by said wall means and having transverse flights contacting the upper surface of said medium and any contaminant accreted thereon, power means for advancing said conveyor in said loop with said flights dragging out said accreted contaminant, means including a timer for intermittently actuating said power means so that contaminant accreted on said medium between successive advancements of said conveyor serves as a filter aid, said timer insuring continued advancement of said conveyor for a predetermined period of time, and a filtrate pump having its intake connected to said lower compartment to create a vacuum therein supplementing the static head of said contaminated liquid in said upper compartment to induce the flow of liquid through said medium.

References Cited in the file of this patent

UNITED STATES PATENTS

| | | |
|---|---|---|
| 392,606 | Heywood | Nov. 13, 1888 |
| 1,403,369 | Anderson | Jan. 10, 1922 |
| 2,665,812 | Crane | Jan. 12, 1954 |
| 2,675,129 | Doubleday | Apr. 13, 1954 |
| 2,861,688 | Harms | Nov. 25, 1958 |
| 2,867,324 | Hirs | Jan. 6, 1959 |